United States Patent [19]
Spencer

[11] Patent Number: 5,607,125
[45] Date of Patent: Mar. 4, 1997

[54] CORD HOLDER FOR IRONING BOARD

[76] Inventor: Jerry L. Spencer, 214 Tyler St., Fredericksburg, Va. 22401

[21] Appl. No.: 518,297

[22] Filed: Aug. 23, 1995

[51] Int. Cl.⁶ ....................................................... F16L 3/00
[52] U.S. Cl. ................................ 248/51; 38/141; 191/125
[58] Field of Search .................... 248/51, 52; 191/12 R, 191/125; 226/200, 188; 38/141, 104, 140, 94, 107; 219/256, 259; 211/60.1, 70.5, 89

[56] References Cited

U.S. PATENT DOCUMENTS

| | | | |
|---|---|---|---|
| 1,865,069 | 6/1932 | Allen | 191/12 R |
| 1,974,811 | 9/1934 | Gattinger | 248/51 |
| 2,172,705 | 9/1939 | Johnston | 248/51 |
| 2,190,108 | 2/1940 | Crammond | 248/51 |
| 2,270,997 | 1/1942 | Davis | 248/51 X |
| 2,271,463 | 1/1942 | Reeves | 38/141 |
| 2,473,107 | 6/1949 | Mendelsohn | 38/104 |
| 2,526,412 | 10/1950 | Ravenscroft | 38/141 |
| 2,579,062 | 12/1951 | Aab | 38/104 |
| 2,897,616 | 8/1959 | Edwards | 38/141 |
| 3,214,851 | 11/1965 | Webster | 38/141 |
| 3,234,672 | 2/1966 | Foster | 439/141 |
| 3,774,605 | 11/1973 | Jewett | 226/188 X |
| 4,042,082 | 8/1977 | Hellmiss et al. | 191/12 R X |
| 4,798,298 | 1/1989 | Urestta | 211/70.5 |
| 4,956,928 | 9/1990 | Lehrman | 38/107 |

FOREIGN PATENT DOCUMENTS 107473  11/1924  Switzerland ........................ 191/12 S

*Primary Examiner*—Alvin C. Chin-Shue
*Assistant Examiner*—Korie H. Chan
*Attorney, Agent, or Firm*—Patent & Trademark Services Joseph H. McGlynn

[57] ABSTRACT

An ironing cord holder which will keep the cord out of the way when ironing. The holder has a pair of spring biased spindles which rotate in opposite directions from each other. The spindles are spaced apart so that an iron cord will fit between them in a tight friction fit. When the iron is moved away from the cord holder, the spindles will rotate and tighten the springs. When the iron is moved toward the cord holder, the springs will pull the cord, thereby keeping the cord out of the way while ironing.

5 Claims, 1 Drawing Sheet

CORD HOLDER FOR IRONING BOARD

BACKGROUND OF THE INVENTION

This invention relates in general to cord holders and in particular to cord holders that will hold the cord of an electric iron out of the way while a person is ironing.

Description of the Prior Art

In the prior art ironing board cord holders or guides have been known. However the holders or guides of the prior art were often bulky or cumbersome devices that had to be attached to the ironing board each time it was used and removed when the ironing was done. Also, the devices were cumbersome and often allowed the cord to tangle or jam, causing more work than they saved.

SUMMARY OF THE INVENTION

This invention is a cord holder or guide for an ironing board that is small, compact, easy to mount, and once mounted can be left in place. The present invention consists of a pair of spring loaded spindles that hold the iron cord between them. As the iron is moved away from the holder the spindles allow the cord to slide effortlessly to any position. When the iron is moved toward the holder, the spring loaded spindles move in the opposite direction under the influence of the springs, thereby pulling the cord out of the way of the iron.

It is an object of the present invention to provide an iron cord holder or guide that is compact and easy to mount.

It is an object of the present invention to provide an iron cord holder or guide that can be permanently mounted on the ironing board.

It is an object of the present invention to provide an iron cord holder or guide that will retract the cord of the iron without the use of unsightly weights.

These and other objects and advantages of the present invention will be fully apparent from the following description, when taken in connection with the annexed drawings.

DESCRIPTION OF THE PREFERRED EMBODIMENT

Figure 1:
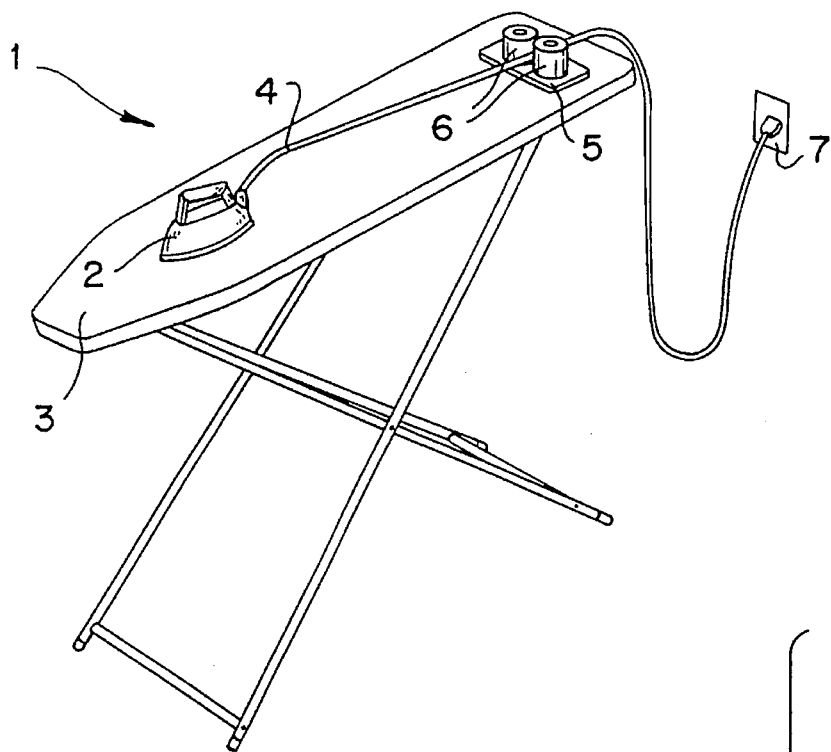
FIG. 1 is a view showing the cord holder mounted on an ironing board.
Figure 3:
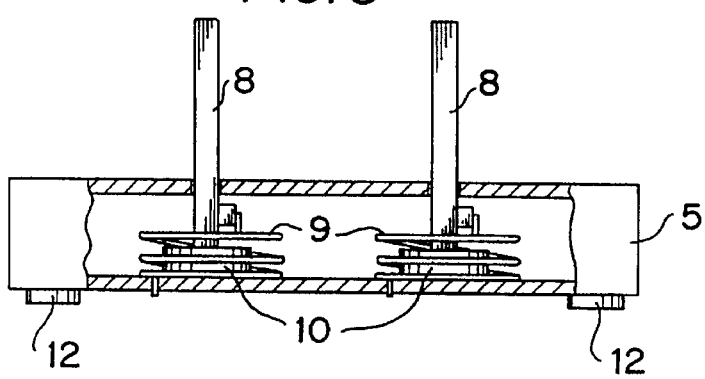
FIG. 3 is a cut away view of the base of the cord holder.

Referring now to the drawings in greater detail, FIG. 1 shows the present invention 1 mounted on a conventional ironing board 3. Although the cord holder is shown mounted on the widest part of the ironing board, it should be understood that the cord holder could be mounted on any end and still perform in the intended manner. The cord holder, as shown in FIG. 3, consists of a base 5 to which a pair of reels 10 are mounted. The base can be made in two parts in order to allow the reels 10, the posts 8, and the springs 9 to be assembled. The two parts of the base can then be permanently attached such as by, but not limited to, ultrasonic welding.

Figure 4:
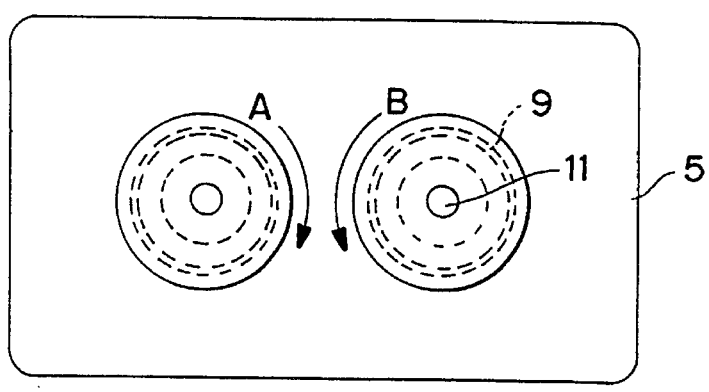
FIG. 4 is a top view of the cord holder.

Each of the reels 10 has a coil spring 9 wound around the reel, as shown in FIGS. 3 and 4. One end of each of the springs 9 can be secured to the base 5 in any conventional manner, such as by providing a hole in the base into which an end of the spring is inserted, and by providing a small post 14 such that the other end of the spring is welded thereto (see FIG. 2). If the small post is used, a channel will be provided on the spindle 6 that the small post can fit into. The other end of each of the springs 9 can be secured to the reel 10. How the springs 9 are secured to the base 5 and the reels 10 is not a part of the invention and any manner of securing the springs at each end that will accomplish the desired result can be used. Each spring 9 is wound around the reels 10 in opposite directions as indicated by the arrows A and B in FIG. 4.

Figure 2:
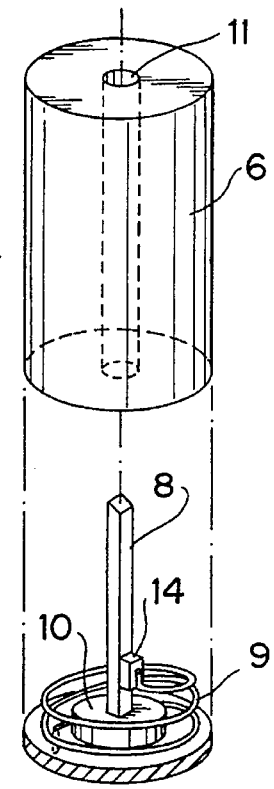
FIG. 2 is an exploded view of the spindles.

Attached to each of the reels 10 is a post 8 (see FIGS. 2 and 3). The posts are shown in the drawings as rectangular or square, however, the shape is not material as long as the post can be affixed to the reels 10 and the spindles 6 so the posts do not rotate with respect to the reels or the spindles. One way of accomplishing this is to make the posts 8 rectangular and the hole in the reel and the hole 11 in the spindle, that receives the posts, circular. However, any method of accomplishing the desired result can be used without departing from the scope of the invention.

Figure 5:
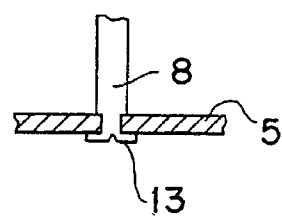
FIG. 5 is a partial view showing the post attached to the base.

The posts 8 will pass through the reels 10 and be rotatably attached to the base 5. If the posts are rectangular, the part that is attached to the base would be circular so that the rectangular posts could rotate with respect to the base. The posts could be rotatably attached to the base in any conventional manner such as, but not limited to, passing an end of the posts through an aperture in the base and then upsetting or making the end larger (as shown at 13 in FIG. 5) so the post can not come back through the aperture in the base.

Attached to each of the posts 13 is a cylindrical spindle 6. One of the spindles is shown in exploded view in FIG. 2. In this view the base 5 has been removed for clarity. Each of the spindles 6 is attached to a respective reel 10. Again, how this is accomplished is not material to the invention, and any conventional method can be used. For example, the spindles and the reels can be attached to each other by a friction fit or by ultrasonic welding.

The length of the base 5 is approximately 2½ inches and can be of any convenient width and depth. The posts 8 are approximately 1 inch long and can be made of metal or plastic. The base 5 is made of ¼ inch plastic. It should be noted that the above dimensions and materials are for illustrations purposes only, and the dimensions and the materials can be changed without departing from the scope of the invention.

The manner of using the cord holder will now be described. After the ironing board 3 is set up and an iron 2 is placed on the ironing surface, the cord 4 from the iron will be placed between the spindles 6 as shown in FIG. 1. The cord can then be plugged into a conventional electrical outlet 7. The distance between the spindles 6 is such that the cord 4 will be held in a snug, friction fit. When the iron is moved away from the cord holder, the friction between the cord and the spindles 6 will cause the spindles to rotate in the direction of the arrows A and B in FIG. 4. As the spindles rotate the springs 9 will be wound tighter around the reels 10. When the iron is moved toward the cord holder, the spindles, under the action of springs 9, will rotate in the opposite direction. The friction between the cord 4 and the spindles 6 will "pull" the cord toward the cord holder. In this manner the iron cord will always be out of the way of the iron.

Also, it should be noted that the base 5 could be attached to the ironing board 3 through the use of glue-on Velcro patches 12 as shown in FIG. 3. This will allow the cord holder to remain on the ironing board in a semi-permanent manner, or it could be easily removed if so desired. Also, the elements 9 have been described as springs throughout the specification, however, these elements are not limited to metal springs. They could be made from any material that is resilient such as rubber or plastic, as long as the material selected can act in the same manner as a coil spring.

Although the ironing board cord holder and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An ironing board cord holder comprising:

a base, at least a pair of first rotatable means rotatably attached to said base, second rotatable means having a first diameter and being non-rotatably attached to each of said first rotatable means, third rotatable means having a second diameter greater than the first diameter and being non-rotatably attached to each of said first rotatable means, first resilient means having one end attached to said base and another end attached to one of said first rotatable means for rotating said first and third rotatable means in one direction, and a second resilient means having one end attached to said base and another end attached to another of said first rotatable means for rotating another of said first and third rotatable means in a direction opposite to said one direction, each of said third rotatable means is a hollow cylindrical element, and each of said third rotatable means surrounds a respective one of said first and second rotatable means.

2. The ironing board cord holder as claimed in claim 1, wherein each of said first rotatable means is a post.

3. The ironing board cord holder as claimed in claim 2, wherein said post is rectangular over a major portion of its length and circular over the remainder of its length.

4. The ironing board cord holder as claimed in claim 1, wherein each of said second rotatable means is a cylindrical element and each of said first and second resilient means surrounds a respective one of said second rotatable means.

5. The ironing board cord holder as claimed in claim 1, wherein said base has attachment means for mounting said cord holder to an ironing board.

\* \* \* \* \*